United States Patent [19]

Nielsen, Jr. et al.

[11] Patent Number: 4,609,217
[45] Date of Patent: * Sep. 2, 1986

[54] TAMPER INDICATING COVER FOR A GAS METER

[75] Inventors: Anker J. Nielsen, Jr., 410 Bailey Rd., Holden, Mass. 01520; George W. Davis, Warren, N.J.

[73] Assignee: Anker J. Nielsen, Jr., Holden, Mass.

[*] Notice: The portion of the term of this patent subsequent to Sep. 18, 2001 has been disclaimed.

[21] Appl. No.: 520,989

[22] Filed: Aug. 8, 1983

Related U.S. Application Data

[63] Continuation-in-part of Ser. No. 360,169, Mar. 22, 1982, Pat. No. 4,471,982.

[51] Int. Cl.⁴ .............................................. B65D 33/34
[52] U.S. Cl. .................................................. 292/307 B
[58] Field of Search ................................. 16/382, 383; 292/DIG. 38, 307; 411/910; 339/205-210, 91; 285/80, 150

[56] References Cited

U.S. PATENT DOCUMENTS

| | | | |
|---|---|---|---|
| 1,380,362 | 6/1921 | Cunningham | 411/458 |
| 2,174,430 | 9/1939 | Valentine et al. | 16/382 X |
| 3,380,267 | 4/1968 | Winchester | 292/307 |
| 3,485,521 | 12/1969 | Moberg | 292/320 |
| 3,876,821 | 4/1975 | Pringle | 411/529 X |
| 4,286,640 | 9/1981 | Knox et al. | 292/307 B |
| 4,372,593 | 2/1983 | Kesselman | 411/910 |
| 4,471,982 | 9/1984 | Nielsen, Jr. | 292/307 B |

Primary Examiner—Richard E. Moore
Attorney, Agent, or Firm—Irving M. Kriegsman

[57] ABSTRACT

A tamper indicating cover for a nut securing a gas supply line pipe to a gas meter is disclosed. The cover includes a pair of "C" shaped mating cavity sections which are made of plastic and which are shaped and sized to fit around the top, sides and bottom of the nut and a metal hinge clip which is adapted to be permanently snap-locked into the lower end of each cavity section. The upper end of one cavity section is secured to the upper end of the other cavity section either by a metal clip which is adapted to be snap-locked into each end, if permanent coupling is desired, or a wire seal which is inserted through an opening formed at each end, if non-permanent coupling is desired.

14 Claims, 12 Drawing Figures

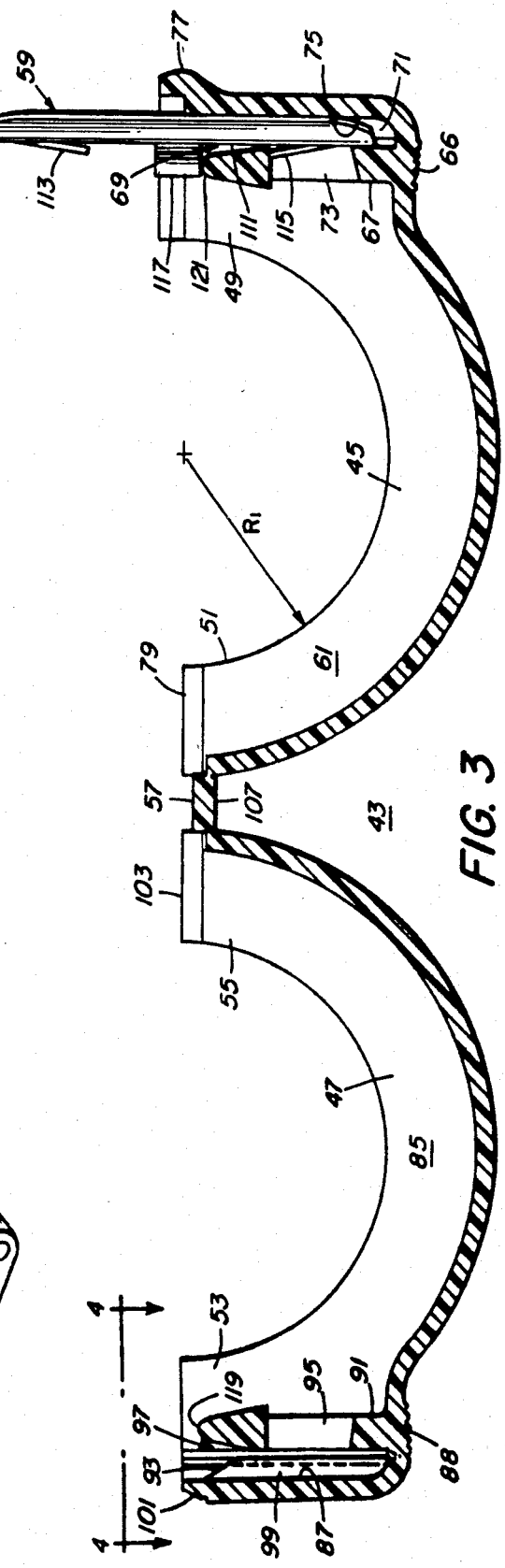
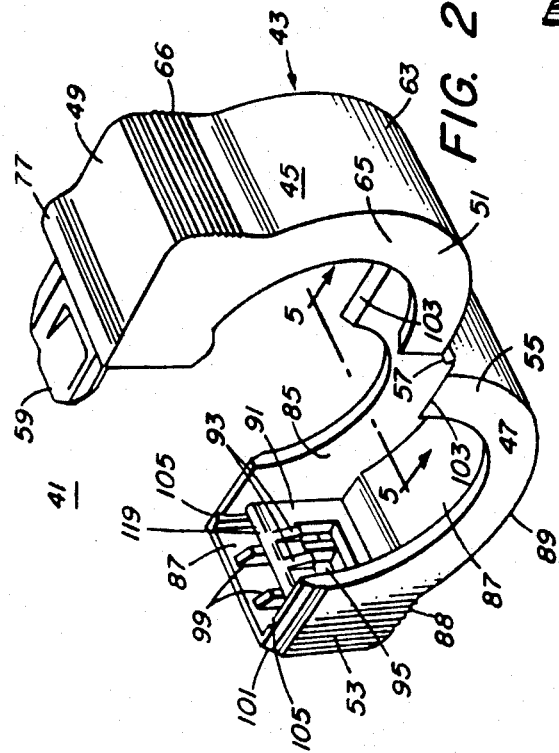
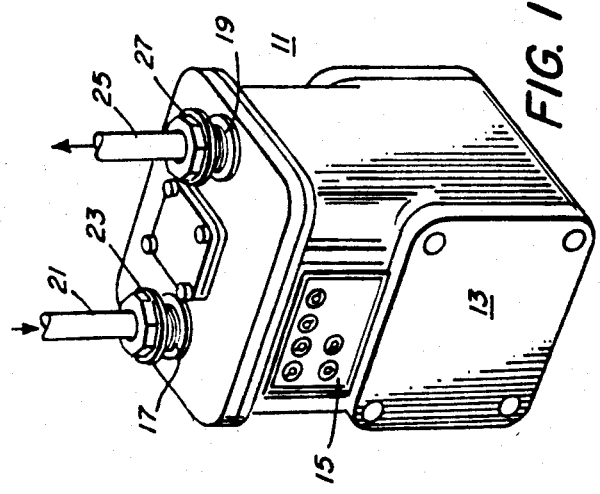

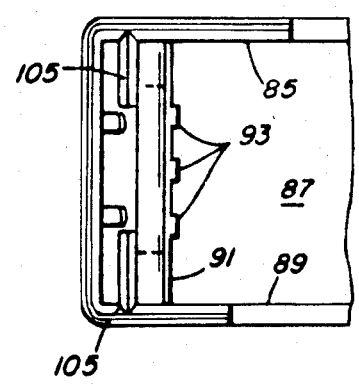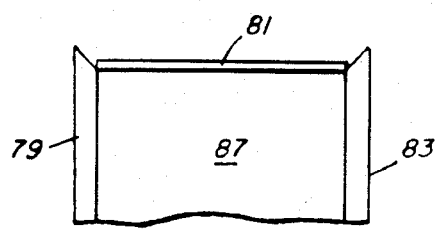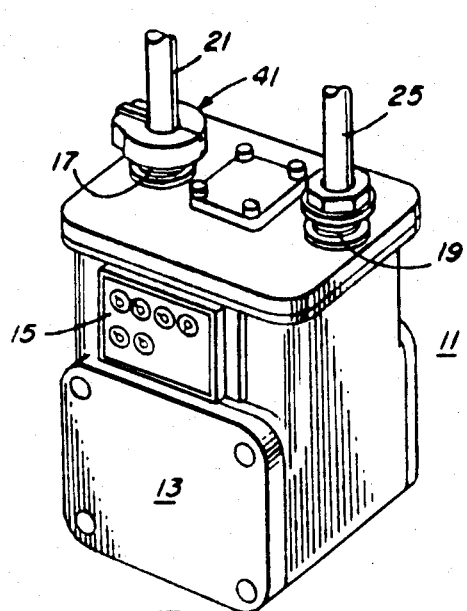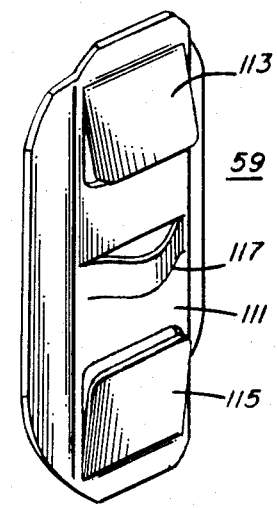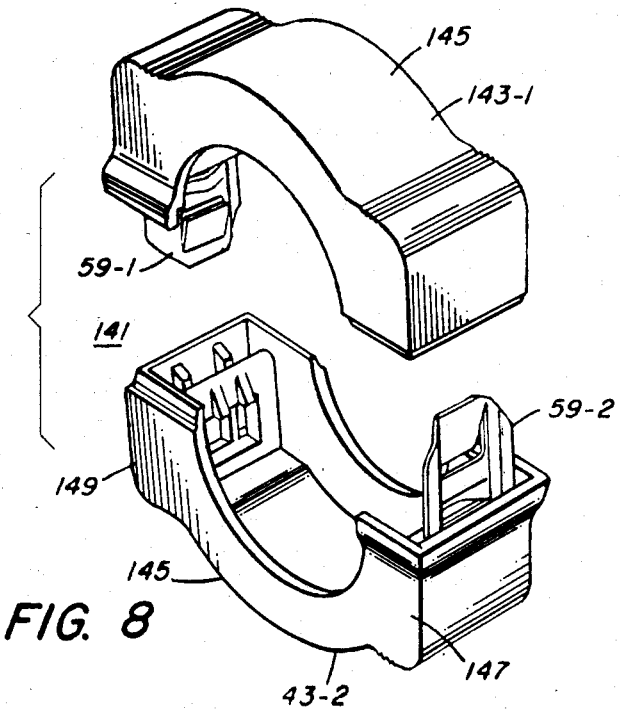

TAMPER INDICATING COVER FOR A GAS METER

CROSS-REFERENCE TO RELATED APPLICATIONS

This application is a continuation-in-part of U.S. patent application Ser. No. 360,169 filed on Mar. 22, 1982 in the name of Anker J. Nielsen, Jr. and entitled Tamper Indicating Cover For A Gas Meter, now U.S. Pat. No. 4,471,982, issued Sept. 18, 1984, which application is incorporated herein by reference.

BACKGROUND OF THE INVENTION

The present invention relates generally to a tamper indicating cover for a gas meter and more particularly to a tamper indicating cover for a nut securing the output end of a gas supply line pipe to the inlet port of a gas meter used in monitoring the flow of gas to a home or other building.

Since the oil embargo of 1973 the cost of energy, i.e. gas, oil and electricity, has skyrocketed. Because of the higher prices and for various other reasons there has been a marked increase over the past several years in consumers stealing or attempting to steal the energy furnished by the utilities or private suppliers. One scheme for pilfering energy, which has become more than simply a nuisance, has involved by-passing the gas meter used to monitor the flow of gas into a home or other building. As is known, the amount of gas used by a consumer is monitored by a gas meter which is located at the user site. The gas meter includes an inlet port which is connected to the gas supply line pipe and an outlet port which is connected to another pipe which is connected to one or more gas operated appliances in the home or other building. Each pipe is usually secured to its respective port on the meter by means of a nut which is slidably mounted on the pipe and screwed into the respective port. As can be appreciated, by simply unscrewing the nut fastened onto each port, then disconnecting the two pipes from their respective ports and then connecting the two pipes directly to each other, such as by another pipe, the gas meter can be easily by-passed. One way to prevent by-passing the gas meter involves mounting a locking device over the nut securing the gas supply line pipe to the inlet port of the gas meter so that the gas supply line pipe cannot be disconnected from the inlet port of the gas meter. The problem with this approach is that locking devices which have been constructed for this purpose are relatively expensive and thus not economically feasable for use on every gas meter.

A more practical and less expensive approach would involve placing a temper indicating cover over the nut which must be broken before the nut can be accessed. Accordingly, the need exists for a tamper indicating cover which is adapted to be mounted on the nut of a gas meter.

SUMMARY OF THE INVENTION

It is an object of this invention to provide a tamper indicating cover for a gas meter.

It is another object of this invention to provide a tamper indicating cover for a nut securing the outlet end of a gas supply line pipe to an inlet port of a gas meter.

It is still another object of this invention to provide a tamper indicating cover as described above which prevents access to the nut when mounted thereon and which after being mounted thereon and locked in place is virtually impossible to remove therefrom without being broken.

It is yet still another object of this invention to provide a tamper indicating cover as described above which is designed to break easily in an unexpected location if an attempt is made to pull or pry it apart after it has been closed.

It is a further object of this invention to provide a tamper indicating cover as described above which can be easily broken, if removal is desired.

It is still a further object of this invention to provide a tamper indicating cover as described above which is extremely difficult to reassemble once it has been broken without revealing that it has been broken.

It is another object of this invention to provide a tamper indicating cover as described above which is easy and economical to manufacture, which contains a minimum number of parts, which is easy to install and which can be made by mass production techniques.

It is a further object of this invention to provide a tamper indicating cover which is constructed so that it can be assembled on a nut in either a non-reusable or a reusable manner.

A tamper indicating cover for a nut securing a gas supply line pipe to an inlet port of a gas meter constructed according to the teachings of the present invention comprises a pair of plastic, "C" shaped, mating cavity sections sized to loosely fit around the nut, one cavity section on each side of the nut, a hinge clip adapted to be snap-locked to one end of each cavity section for permanently locking one end of one cavity section to one end of the other cavity section and means for securing the other end of one cavity section to the other end of the other cavity section. The means for securing the other end of the two cavity sections together may either be a clip which is adapted to permanently connect the two other ends together or a wire seal which may be broken if desired without breaking the two cavity sections.

Various features, objects and advantages of the invention will appear from the description to follow. In the description, reference is made to the accompanying drawings which form a part thereof, and in which is shown, by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not be taken in a limiting sense, and the scope of the present invention is best defined by the appended claims.

BRIEF DESCRIPTION OF THE DRAWINGS

In the drawings wherein like reference numerals represent like parts:

FIG. 1 is a perspective view of a typical gas meter;

FIG. 2 is a perspective view of one embodiment of a tamper indicating cover constructed according to the principles of the present invention, in a partially "open" position;

FIG. 3 is a front section view of the tamper indicating cover shown in FIG. 2, with the two cavity sections being opened to an angle of about 180°;

FIG. 4 is a section view taken along line 4—4 in FIG. 3 illustrating a portion of one of the upper ends of one of the cavity sections;

FIG. 5 is a section view taken along lines 5—5 in FIG. 2 illustrating a portion of one of the lower ends of one of the cavity sections;

FIG. 6 is a perspective view of the clip in the tamper indicating cover shown in FIG. 2.

FIG. 7 is a perspective view showing the tamper indicating cover of FIG. 2 mounted over the nut on the inlet port of the gas meter shown in FIG. 1;

FIG. 8 is a partly exploded perspective view of another embodiment of a tamper indicating cover constructed according to the teachings of the present invention.

DETAILED DESCRIPTION OF PREFERRED EMBODIMENT

Figure 9:
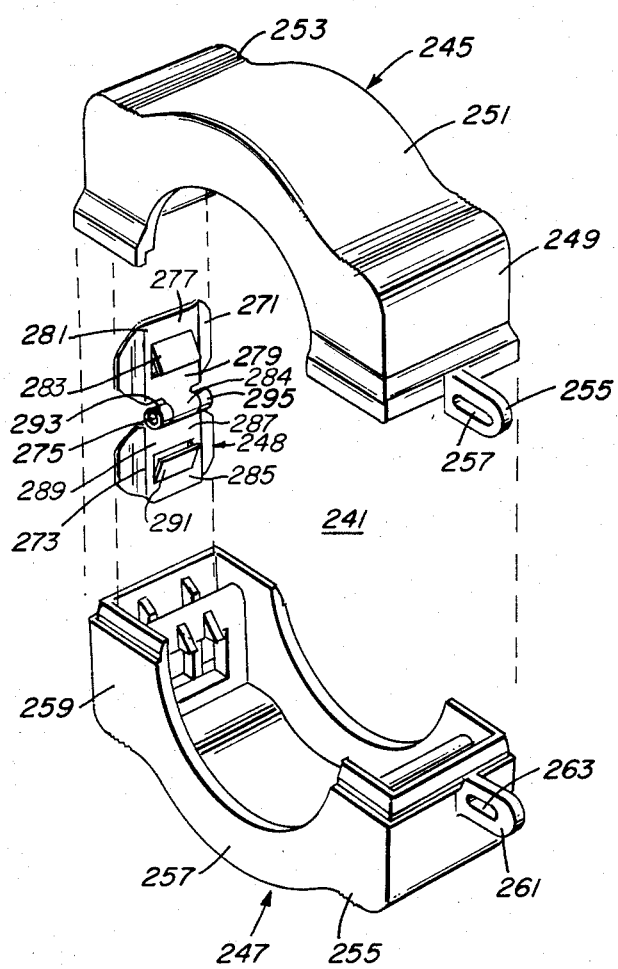
FIG. 9 is an exploded perspective view of another embodiment of a tamper indicating cover constructed according to the teachings of the present invention with the coupling means for joining the two cavity sections together at one end omitted.

The present invention is directed to a tamper indicating cover for use on a nut securing a gas supply line pipe to the inlet port of a gas meter of the type found in a home or other building for monitoring the flow of gas into the home or other building.

Referring now to the drawings, there is illustrated in FIG. 1 a gas meter identified generally by reference numeral 11. Gas meter 11 includes a box shaped housing 13 having a face plate 15 containing a set of dials, an externally threaded gas inlet port 17 and an externally threaded gas outlet port 19. A gas supply line pipe 21 is connected to gas inlet port 17 and is secured thereto in the customary manner by means of a nut 23 which is slidably mounted on the gas supply line pipe 21 and in threaded engagement with gas inlet port 17. An outlet pipe 25, adapted to be connected to one or more gas operated appliances (not shown) at its output end, is connected at its input end to gas outlet port 19 and is secured thereto in a conventional manner by a nut 27 which is slidably mounted on a pipe 25 and in threaded engagement with gas outlet port 19.

Referring now to FIGS. 2 to 6 there is illustrated one embodiment of a tamper indicating cover constructed according to the teachings of the present invention and identified generally by reference numeral 41.

Although the invention will be described hereinafter for use in connection with covering nut 23, on the inlet side of gas meter 11, it is to be understood, of course, that the invention may also be used for covering nut 27, on the outlet side of gas meter 11, if desired, or for that matter, for covering a nut used in securing any pair of members together.

Tamper indicating cover 41 comprises a unitary structure 43.

Unitary structure 43 is made of a suitable plastic, such as polypropylene. The plastic preferably contains about 2% carbon black to prevent cracking from exposure to UV radiation from the sum. Structure 43 includes a pair of generally "C" shaped, mating, cavity sections 45 and 47 which are sized and shaped so as to fit around the top, sides and bottom of nut 23. Cavity section 45, includes an upper end 49 and a lower end 51, upper end 49 being somewhat enlarged and generally rectangular in cross section. Cavity section 47 includes an upper end 53 and a lower end 55, upper end 53 also being somewhat enlarged and generally rectangular in cross-section. Except for the differences as will hereinafter be noted, the two cavity sections 45 and 47 are generally similar in size and shape, one cavity section being essentially a mirror image of the other when connected as will hereinafter be described. Unitary structure 43 further includes a hinge section 57 which pivotally connects the lower ends 51 and 55 of the two cavity sections 45 and 47 together.

Tamper indicating cover 41 further includes a clip 59 which is adapted to be snap-locked into an internal slot located in each one of the outer ends 49 and 53 for snap locking the two upper ends 49 and 53 together when the two upper ends 49 and 53 are brought into mating engagement with each other.

Cavity section 45 is defined by a generally semi-annular back wall 61, a generally semi-cylindrical side wall 63 and a generally semi-annular front wall 65. The outside surface of side wall 63 includes a plurality of finger gripping serrations 66 which are located near upper end 49. An internal wall or shelf 67 is integrally formed in upper end 49, the space between internal wall 67 and side wall 63 defining a clip receiving slot 69 for one end of clip 59. Internal wall 67 includes a plurality of longitudinally extending strengthening ribs 71 and has a centrally disposed rectangular shaped tongue receiving hole 73. A plurality of longitudinally extending guide ribs 75 for use in guiding and supporting clip 59 when it is inserted in clip receiving slot 69 are formed on the inside surface of side wall 63 inside the clip receiving slot 69. A peripheral flange 77 is formed on the end of upper end 49 which extends over the end of upper end 53 when the two upper end portions 49 and 53 are brought together. Edges 79, 81 and 83 at the lower end 51 of top wall 61, side wall 63 and front wall 65, respectively, are bevelled at a 45° angle so as to have a minimum surface area where they contact the corresponding edges of inner end 55 on cavity section 47.

Cavity section 47 includes a generally semi-annular back wall 85, a generally semi-cylindrical side wall 87, having finger gripping serrations 88, a generally semi-annular front wall 89, an internal wall 91 at the upper end portion 53 having strengthening ribs 93 and a centrally located rectangular shaped tongue receiving hole 95, a clip receiving slot 97 defined by the space between internal wall 91 and side wall 87, guide ribs 99 on side wall 87 for supporting clip 59, a bevelled end surface 101 at end portion 53 for fitting inside and mating with end portion 49 when the two upper ends are brought together, and 45° bevelled end surfaces 103 on back wall 85, side wall 87 and front wall 89 at lower end portion 55, the internal wall, the guide ribs the strengthening ribs, the tongue receiving hole and the clip receiving slot being identical in construction to the corresponding elements in upper end 49. Upper end 53 of cavity section 47 further includes a broken lateral "V" shaped groove 105 defining a hidden line of a weakness which will break if hinge section 57 is broken or cut when the cavity sections 45 and 47 are locked together with clip 59 and an attempt is made to pry the two cavity sections apart by pivoting them about their connected upper ends 49 and 53.

Hinge 57 is a living hinge and is shaped so that its outer surface 107 is generally flat, making it thereby difficult to snip or cut off.

Unitary structure 43 may be made by any suitable process for making articles of plastic, such as by thermoplastic injection molding. The thickness of the front, side, back and internal walls in the cavity sections is preferably on the order of around 0.062 inches and the thickness of the hinge section 57 is preferably about 3/32 of an inch.

Clip 59 which is shown fully in FIG. 6, is an elongated generally rectangularly shaped sheet or strip of stainless steel sized so that it can be slidably inserted into the clip receiving slots and having a thickness preferably on the order of 0.02 inches. Clip 59 includes a raised rectangular central portion 111, a pair of rectangular spring biased tongue elements 113 and 115 formed on the raised central portion 111 which project down into holes 73 and 95 when the clip 59 is inserted into the clip receiving slots 69 and 97 and a raised stop 117, also formed on the central portion 111, which limits the inward movement of the clip when it is inserted in the clip receiving slots 69 and 97 by abutting against end surfaces 119 and 121 of inner walls 67 and 91, respectively.

Cavity sections 45 and 47 are sized so that the inside diameter of the cylindrical shape defined by side walls 63 and 87 when the two cavity sections are closed is larger than the outside cross-sectional diameter of nut 23. Consequently, cover 41 is free to rotate when it is mounted thereon and closed and if rotated will not produce corresponding rotational movement (turning) of nut 23. The inside diameter of the annular ring defined by back walls 61 and 85 (i.e. twice radius R1) is greater than the outside diameter of pipe 21 and less than the outside diameter of the top of nut 23. Consequently, cover 41 cannot be slid down off nut 23 after it is mounted thereon and closed. The inside diameter of the annular ring defined by front walls 65 and 89 is greater than the outside diameter of inlet port 17 and less than the outside diameter of the bottom of nut 23. As a result, cover 41 cannot be raised off nut 23 once mounted thereon and closed.

In assemblying cover 41, clip 59 is inserted into one of the clip receiving slots, such as slot 69 in cavity section 45 (as shown in FIG. 2) and pushed inward until stop 117 abuts against the front edge 119 of inner wall 67. At this point tongue 113 extends into hole 73, locking thereby the clip 59 into upper end portion 49. Cover 41 is then ready to be mounted on nut 23.

After cover 41 is placed around nut 23 with one cavity section on each side thereof, the two upper ends 49 and 53 brought together so that clip 59 snap locks into the clip receiving slot 97 in the upper end 53.

Cover 41 mounted on nut 23, as such, is shown in FIG. 7.

Referring now to FIG. 8, there is illustrated another embodiment of a cover constructed according to the teachings of the present invention and identified generally by reference numeral 141.

Cover 141 includes a pair of plastic "C" shaped mating cavity sections which are identical and are labelled 143-1 and 143-2 respectively, and a pair of metal clips 59 which are labelled 59-1 and 59-2 respectively. Each one of the cavity sections includes a central or intermediate portion 145 which is identical to the corresponding central portions of cavity sections 45 and 47, a female end section 147 identical in construction to upper end section 49 of cavity section and a male section 149 identical in construction to end section 53 of cavity section 47. As can be appreciated, each one of the cavity sections 141 is equivalent to cavity section 45 with end 51 replaced by end 53 (or cavity section 47 with end 55 replaced by end 49).

In using cover 141, the two cavity sections are arranged so that the male end 149 of cavity sections 143-1 is positioned to mate with the female end 147 of cavity section 143-2 and the female end 147 of cavity section 143-1 is positioned to mate with the male end 149 of each one of the mating ends as shown in FIG. 8. After the two cavity section 143-1 and 143-2 are positioned around the nut each pair of mating ends is snap-locked shut at each end through its respective clip 59.

Referring now to FIG. 9, there is illustrated another embodiment of a cover constructed according to the teachings of the present invention and identified generally by reference numeral 241.

Cover 241 includes a first and second plastic "C" shaped mating cavity sections labelled 245 and 247, respectively, and a metal hinge clip 248.

As can be seen, no means are shown for securing the right end of cavity section 245 to the right end of cavity section 247. This is because, these two ends may be secured together in either one of two ways, as will hereinafter be described.

Cavity section 245 includes a first female end or right end 249 an intermediate portion 251 and a second female or left end 253. Female end 249 includes an extension 255 having a transverse wire receiving slot 257. Except for the extension 255, female end 249 is identical to female end 147 in the FIG. 8 embodiment. Intermediate portion 251 is identical to intermediate portion 145 in the FIG. 8 embodiment. Female end section 253 is identical to female end section 147 in the FIG. 8 embodiment.

Cavity section 247 includes a first male end or right end 255, an intermediate portion 257 and a second male end or left end 259. First male end 255 includes an extension 261 having a transverse slot 263. Except for the extension 261, first male end section 255 is identical to male end section 249 in the FIG. 8 embodiment. Intermediate portion 257 is identical to intermediate portion 145 in the FIG. 8 embodiment. Section male section 259 is identical to male section 149 in the FIG. 8 embodiment. When the two cavity sections are closed, extension 261 is positioned adjacent extension 255 with their respective slots in alignment with one another.

Metal hinge clip 248 is of a generally rectangular configuration and includes a first generally rectangular member 271, a second generally rectangular member 273 and a pin 275. First member 271 includes a first or outer end 277 a second or inner end 279 and a raised central rectangular portion 281 having a rectangular spring biased tongue element 283. Inner end 279 includes a tab 284 which is bent around pin 275. Second member 273 includes a first or outer end 285, a second or inner end 287 and a raised central rectangular portion 289 having a rectangular spring biased tongue element 291. Inner end 287 includes a pair of tabs 293 and 295 which are bent around pin 275. Pin 275 is a solid metal pin. The corners on inner end 279 of first member 271 and the inner end 287 of second member 273 are cut at a 45° angle so that first member 271 and second member 273 can be freely pivoted back about pin 275 when the cavity sections are pivoted open. Clip 248 is sized similar to clip 59 so that it can be slidably inserted into the slots in the end sections of the cavity sections and in this respect functions in the same manner as clip 59. When so inserted the hinge portion also serves as a stop similar to stop 117. The thickness of first and second members 271 and 273 is preferably on the order of 0.02 inches.

Female end section 249 of cavity section 245 may be secured to male end section 255 of cavity section by either using a clip 59 (or, for that matter another clip 248) if permanent locking together of the two ends is desired or by using a wire seal such as a bayonet type wire seal, if non-permanent securing of the two ends is desired.

Figure 10:
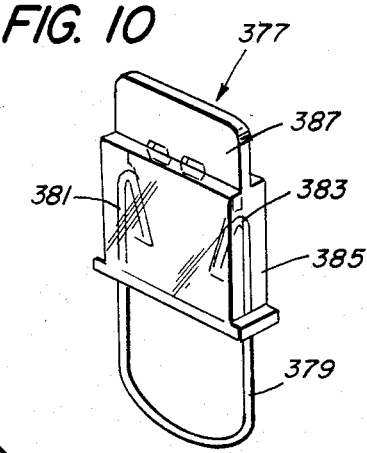
FIG. 10 is a perspective view of a bayonet type wire seal.

An example of a bayonet type wire seal is shown in FIG. 10 and identified by reference numeral 377. As can be seen, seal 377 includes a looped stainless steel length of wire 379 having bayonet shaped ends 381 and 383, a transparent plastic receptacle 385 and a plastic retaining member 387.

Figure 11:
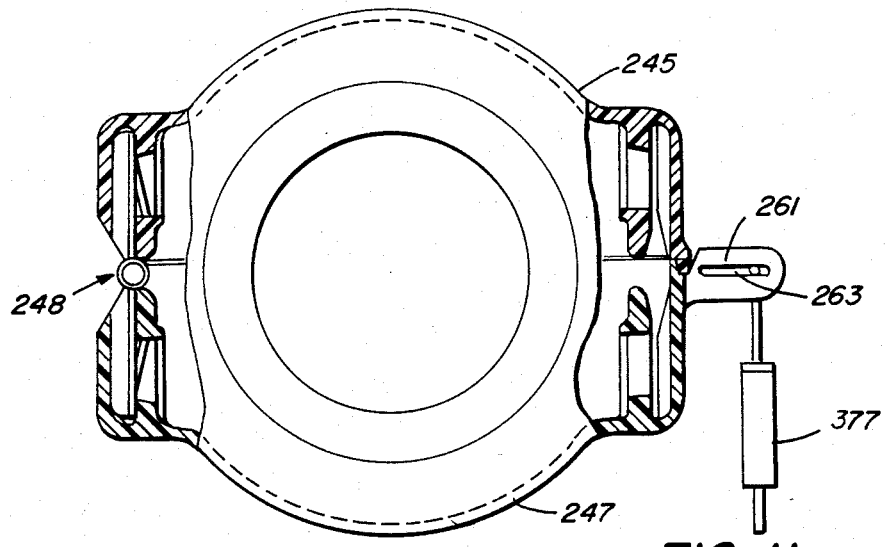
FIG. 11 is a front section view of the embodiment of the invention shown in FIG. 9 with the two cavity sections closed and secured at both ends using the bayonet type wire seal shown in FIG. 10 at the other end.

In FIG. 11 there is shown a section view of tamper indicating cover 241 wherein female end section 249 is secured to male end section 255 with a bayonet type wire seal 377. If removal of cover 241 is desired after it has been mounted on a nut, seal 377 is broken and the two cavity sections pivoted open about hinge clip 248.

Figure 12:
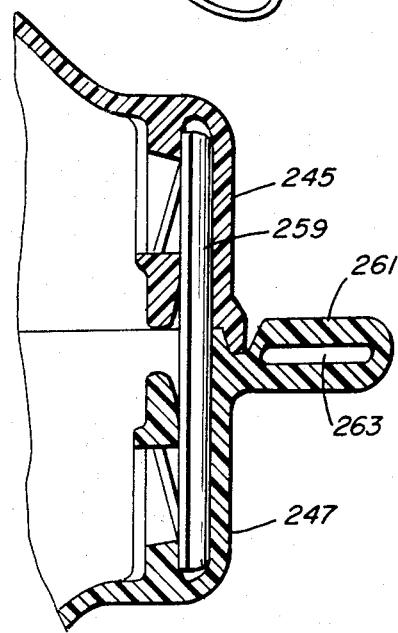
FIG. 12 is a fragmentary front section view of the embodiment of the invention shown in FIG. 9 with the two cavity sections closed and secured at both ends using the clip shown in FIG. 6 at the other end.

In FIG. 12 there is shown a portion of a section view of tamper indicating cover 241 wherein female end section 249 is secured to male end section 255 with a clip 59.

As can be appreciated, a main advantage of cover 241 is that it can be used in either of two ways (i.e., permanently locked on the nut using two clips or removably mounted on the nut using a hinge clip and a wire seal.)

It is clear, that the present invention is well adapted to carry out the objects and attain the ends and advantages mentioned above as well as those inherent therein. While presently preferred embodiments of the invention have been described in this disclosure, numerous changes can be made which, with this disclosure, will readily suggest themselves to those skilled in the art and which are emcompassed within the claims hereof.

What is claimed is:

1. A tamper indicating cover for use on a nut securing one end of a length of pipe to a port of a gas meter, said tamper indicating cover comprising:
    a. first and second plastic, unitary structure, "C" shaped, cavity sections sized and shaped so as to loosely fit around said nut with one cavity section disposed on each side thereof, said first cavity section having a first end and a second end, said second cavity section having a first end and a second end, said first and second ends of said first cavity section being matable with said first and second ends, respectively, of said second cavity section, each cavity section having a clip receiving slot at each thereof,
    b. an elongated hinge clip having a spring biased tongue element at each end thereof snap locked by the tongue element at one end into said slot in said second end of said first cavity section and by the tongue element at the other end to said slot in said second end of said second cavity section for locking together said second end of said first cavity section and said second end of said second cavity section, and
    c. means attached to the first end of said first cavity section and said first end of said second cavity section for securing together said first end of said first cavity section and said first end of said second cavity section, said means comprising a clip snap locked at one end into said first end of said first cavity section and at the other end into said first end of said second cavity section for locking together said first end of said first cavity section and said first end of said second cavity section.

2. The tamper indicating cover of claim 1 and wherein said clip locking together said first end of said first cavity section and said first end of said second cavity section is a straight clip.

3. The tamper indicating cover of claim 2 and wherein said hinge clip comprises a first member having a first end and a second end a second member having a first end and a second end and a pin coupling said second end of said first member to said second end of said second member.

4. The tamper indicating cover of claim 3 and wherein said hinge clip is made of metal.

5. The tamper indicating cover of claim 4 and wherein said second ends of said first and second members of said hinge clip are cut at a 45° angle at their corners.

6. The tamper indicating cover of claim 1 and wherein each cavity section comprises a structure having a back wall, a front wall, and a side wall and wherein each end of each cavity section further includes an integrally formed internal wall spaced inward from and generally parallel with said side wall, the space between said internal wall and said side wall at each end defining a clip receiving slot.

7. The tamper indicating cover of claim 1 and wherein the cavity sections contact each other when closed and the ends of each cavity section are bevelled inwardly at their periphery so as to provide a minimum surface area at their line of contact with each other.

8. The tamper indicating cover of claim 7 and wherein the first end of said first cavity section includes a peripheral flange at its outer edge which is adapted to overlap the first end of said second cavity section.

9. The tamper indicating cover of claim 8 and wherein one end of one cavity section includes an internal lateral groove defining a line of weakness.

10. The tamper indicating cover of claim 4, and wherein said metal clip is made of stainless steel and wherein said cavity sections are made of polypropylene.

11. A tamper indicating cover for use on a nut securing one end of a length of pipe to a port of a gas meter, said tamper indicating cover comprising:
    a. first and second plastic, unitary structure, "C" shaped, cavity sections sized and shaped so as to loosely fit around said nut with one cavity section disposed on each side thereof, said first cavity section having a first end and a second end, said second cavity section having a first end and a second end, said first and second ends of said first cavity section being matable with said first and second ends, respectively, of said second cavity section each cavity section having a clip receiving slot to each end thereof,
    b. an elongated hinge clip having a spring biased tongue element at each end thereof snap locked by the tongue element at one end into said slot in said second end of said first cavity section and by the tongue element at the other end of said slot in said second end of said second cavity section for locking together said second end of said first cavity section and said c. means attached to the first end of said first cavity section and said first end of said second cavity section for securing together said first end of said first cavity section and said first end of said second cavity section, and wherein said first end of said first cavity section and said second end of said second cavity section each include an extension having a slot, said slots in said extensions being aligned with one another when said cavity sections are closed and wherein said means for securing said first end of said first cavity section to said first end of said second cavity section comprises a wire seal extending through said slots in said extensions for securing said first end of said first cavity section to said first end of said second cavity section.

12. The tamper indicating cover of claim 11 and wherein said wire seal is a bayonet type wire seal.

13. The tamper indicating cover of claim 11 and wherein said front wall and said back wall of each cavity section are semi-annularly shaped and the side wall of each cavity section is semi-cylindrically shaped.

14. The tamper indicating cover of claim 11 and wherein said inside surface of each side wall of each cavity section includes at least one longitudinally extending guide rib for use in guiding and supporting said hinge clip into said clip receiving slot.

* * * * *